(12) United States Patent
Tabat et al.

(10) Patent No.: US 6,728,082 B2
(45) Date of Patent: Apr. 27, 2004

(54) MAGNETIC TRANSDUCER WITH INTEGRATED CHARGE BLEED RESISTOR

(75) Inventors: Ned Tabat, Chanhassen, MN (US); Paul E. Kupinski, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 298 days.

(21) Appl. No.: 09/824,528

(22) Filed: Apr. 2, 2001

(65) Prior Publication Data

US 2002/0126424 A1 Sep. 12, 2002

Related U.S. Application Data

(60) Provisional application No. 60/274,841, filed on Mar. 9, 2001.

(51) Int. Cl.[7] .............................................. G11B 5/127
(52) U.S. Cl. ...................................................... 360/323
(58) Field of Search ........................ 360/323; 29/603.01

(56) References Cited

U.S. PATENT DOCUMENTS

| | | | | |
|---|---|---|---|---|
| 4,317,149 A | * | 2/1982 | Elser et al. ................. 360/126 |
| 4,800,454 A | * | 1/1989 | Schwarz et al. ........... 360/234.5 |
| 5,559,051 A | | 9/1996 | Voldman et al. .............. 437/51 |
| 5,644,454 A | | 7/1997 | Arya et al. .................. 360/106 |
| 5,710,682 A | | 1/1998 | Arya et al. .................. 360/106 |
| 5,712,747 A | | 1/1998 | Voldman et al. ............. 360/103 |
| 5,742,452 A | * | 4/1998 | Simmons et al. ........ 360/246.1 |
| 5,748,412 A | | 5/1998 | Murdock et al. ............ 360/113 |
| 5,757,590 A | | 5/1998 | Phipps et al. ............... 360/113 |
| 5,757,591 A | | 5/1998 | Carr et al. .................. 360/113 |
| 5,812,357 A | | 9/1998 | Johansen et al. ........... 361/212 |
| 5,877,933 A | | 3/1999 | Johansen et al. ........... 361/220 |
| 5,903,415 A | * | 5/1999 | Gill ............................. 360/323 |
| 6,034,851 A | | 3/2000 | Zarouri et al. .............. 360/137 |
| 6,054,330 A | * | 4/2000 | Phipps et al. ................... 438/3 |
| 6,081,409 A | | 6/2000 | Hughbanks et al. ........ 360/128 |
| 6,125,015 A | | 9/2000 | Carlson et al. ........... 360/245.9 |
| 6,146,813 A | | 11/2000 | Girard et al. ............... 430/319 |
| 6,400,534 B1 | * | 6/2002 | Klaassen ..................... 360/323 |
| 6,424,505 B1 | * | 7/2002 | Lam et al. ................... 360/323 |

FOREIGN PATENT DOCUMENTS

| | | | | |
|---|---|---|---|---|
| EP | 651375 A1 | * | 5/1995 | ............ G11B/5/40 |
| JP | 10233011 A | * | 9/1998 | ............ G11B/5/39 |

* cited by examiner

*Primary Examiner*—David Davis
(74) *Attorney, Agent, or Firm*—Westman, Champlin & Kelly, P.A.

(57) ABSTRACT

A magnetoresistive transducer includes a substrate and a magnetoresistive assembly. At least one bleed resistor couples the magnetoresistive assembly to the substrate. The bleed resistor has a relative large electrical resistance and provides a discharge path for accumulated charge. The arrangement effectively prevents electrostatic discharge damage to the sensor.

15 Claims, 5 Drawing Sheets

MAGNETIC TRANSDUCER WITH INTEGRATED CHARGE BLEED RESISTOR

CROSS-REFERENCE TO RELATED APPLICATION

The present application is based on and claims the benefit of U.S. provisional patent application Serial No. 60/274,841, filed Mar. 9, 2001, the content of which is hereby incorporated by reference in its entirety.

FIELD OF THE INVENTION

The present invention relates to magnetoresistive head assemblies. In particular, the present invention relates to a method and apparatus for reducing charge build-up on a magnetoresistive sensor element of the magnetoresistive head assembly.

BACKGROUND OF THE INVENTION

Magnetoresistive head assemblies are used in magnetic storage systems to detect magnetically encoded information on specially prepared recording media such as magnetic discs. A magnetoresistive head assembly includes a magnetoresistive transducer or sensor element electrically connected to detection circuitry by at least two electrical conductors. The magnetoresistive sensor element has a resistance which modulates in response to changing magnetic fields corresponding to magnetically encoded information on the media. The detection circuitry detects the resulting change in resistance by passing a sense current through the electrical conductors and through the magnetoresistive sensor element and by measuring the voltage drop across the magnetoresistive sensor element. The resulting voltage signal is used to recover information from the medium.

Typically, the magnetoresistive sensor element is formed or fabricated as part of a wafer which is severed into a plurality of sliders. A magnetic writer—generally of the inductive type—is also integrated with the sensor during wafer fabrication. The slider carries the magnetoresistive sensor and writer elements adjacent to the surface of the magnetic storage medium. Together, the magnetoresistive sensor, the inductive writer, and the slider constitute what is called a magnetoresistive head. The slider of the magnetoresistive head is supported above the magnetic storage medium as part of an arm assembly or as part of an E-block assembly. The arm assembly typically includes a support arm, a load beam or spring, a gimbal and the magnetoresistive head. The support arm carries the load beam and the load beam is attached to the gimbal. Lastly, the gimbal is preferably coupled to the slider of the magnetoresistive head. The support arm, load beam and gimbal support and carry the magnetoresistive head adjacent a magnetic storage medium such as a magnetic disc.

The first and second electrical conductors electrically connecting the magnetoresistive sensor element and the detection circuitry typically comprise conductive traces, bonding pads and electrical wires. The conductive traces extend along a surface of the slider and electrically interconnect the magnetoresistive sensor element and the bonding pads. The bonding pads are electrically connected to the magnetoresistive sensor element by the conductive traces and are located on a surface of the slider. The bonding pads provide a surface by which electrical conductors such as wire may be attached to electrically connect detection circuitry and the magnetoresistive sensor. The wires are typically tacked or bonded to the bonding pads and to at least one surface of the slider. The wires further extend along the gimbal, the load beam and the arm to the detection circuitry. These wires can be carried on a flexible carrier such as polyimide.

Electrostatic energy which is conducted or discharged to the magnetoresistive sensor element by direct electrical continuity or dielectric breakdown may possibly damage the magnetoresistive sensor element. Electrostatic energy may be generated any time during the fabrication, assembly, testing and shipment of the disc drive including fabrication of the magnetoresistive head assembly of the head/gimbal assembly, assembly of the E-block assembly of the final disc drive, electrical testing of components and shipment of the components or the disc drive. In response, various procedures and equipment have been installed to control electrostatic discharge (ESD) levels during every stage of handling through final disc drive assembly to prevent damage to the magnetoresistive sensor element caused by ESD. Some ESD handling procedures and equipment can limit or reduce the discharge energy delivered to the magnetoresistive head. However, due to the continual drive to increase storage density in magnetic disc drive units, magnetoresistive sensor elements have become increasingly more sensitive. Because of the decreasing dimensions of advanced magnetoresistive heads and the thinner films used in magnetoresistive sensor elements, electrostatic discharge damage threshold is rapidly falling below the limits that can be controlled through environmental controls. Further, these techniques are expensive and typically require additional processing steps that can reduce yields.

The present invention provides a solution to this and other problems and offers advantages over the prior art.

SUMMARY OF THE INVENTION

The present invention relates to magnetoresistive sensors or transducer assemblies which have bleed resistors to address the above-mentioned problems.

In accordance with one embodiment of the present invention, a magnetoresistive transducer is provided which includes a substrate, an insulating layer on the substrate and a magnetoresistive assembly on the insulating layer. At least one bleed resistor is coupled between the magnetoresistive assembly and the substrate. The bleed resistor has a relatively large electrical resistance and provides a path to discharge electrostatic build up without impacting performance.

These and various other features as well as advantages which characterize the present invention will be apparent upon reading the following detailed description and review of the associated drawings.

DETAILED DESCRIPTION OF ILLUSTRATIVE EMBODIMENTS

Figure 1:
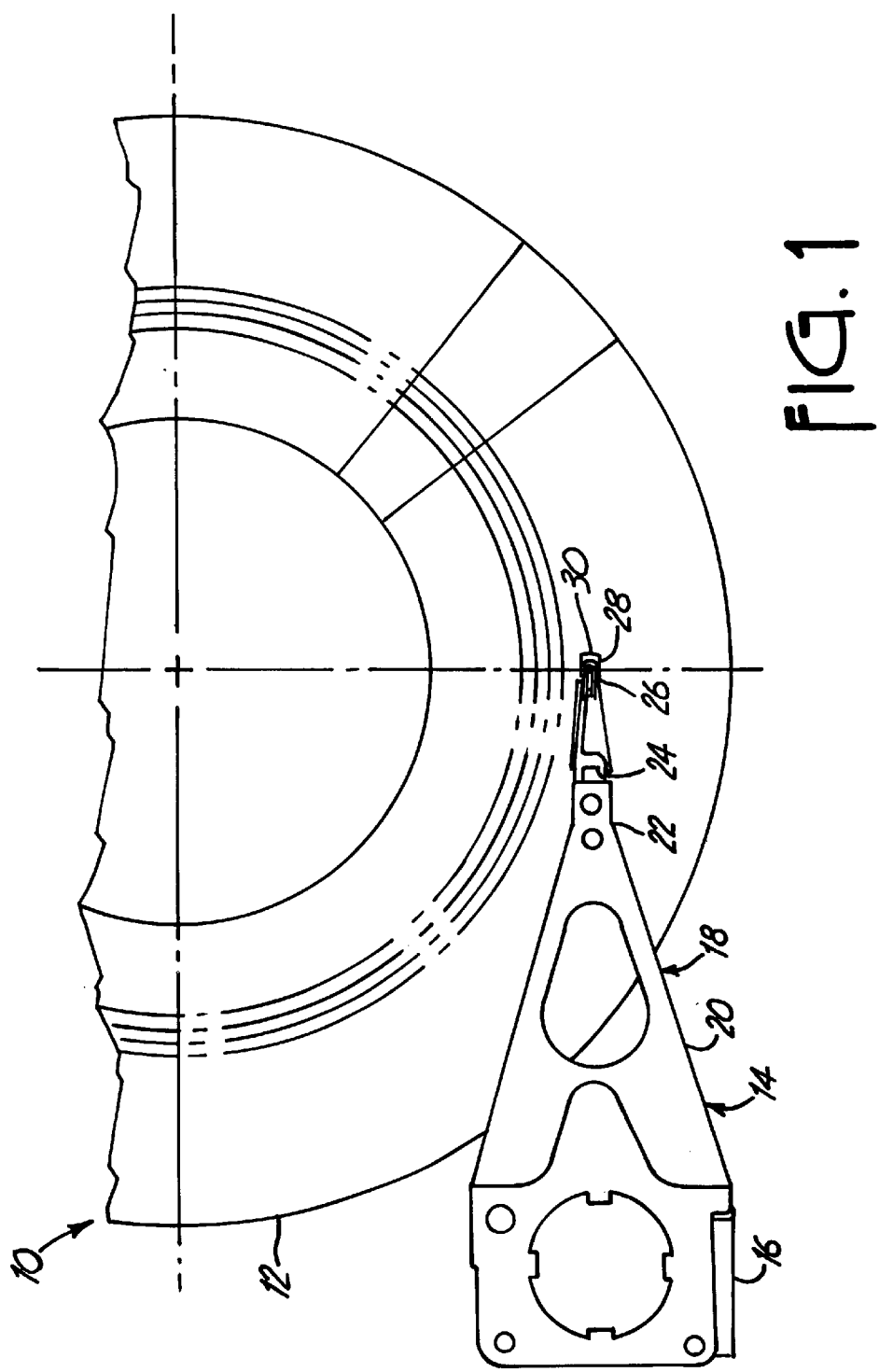
FIG. 1 is a top plan view showing a magnetic disc and an armature.

Referring now to FIG. 1, disc storage system 10 generally is shown which includes magnetic storage disc 12, arm assembly 14, detection circuitry 16 and electrical conductors 18. As is conventionally known, memory storage disc 12 contains magnetically encoded information and is rotated by a spindle motor (not shown).

Arm assembly 14 is supported above memory storage disc 12 by an actuator assembly (not shown) and generally includes actuator arm 20, support arm 22, suspension 24 and head 28. Actuator arm 20 extends from an actuator (not shown) and attaches to support arm 22. Support arm 22 extends from actuator arm 20 and is attached to suspension 24. Suspension 24 preferably comprises an integrated load beam-gimbal suspension including a gimbal portion 26. Alternatively, suspension 24 may include a distinct load beam and a distinct gimbal which are secured to one another, preferably by laser welding. Suspension 24 resiliently supports head 28 in the vertical direction to allow head 28 to follow the topography of disc 12. Suspension 24 also supplies a downward force to counteract the hydrodynamic lifting force developed as disc 12 moves beneath head 28.

Suspension 24 is preferably formed from a material which enables suspension 24 to be flexible in the vertical direction and rigid in in-plane directions for precise head positioning. The gimbal portion 26 of suspension 24 is resiliently flexible in pitch and roll directions of heads 28. At the same time the gimbal portion 26 is preferably rigid in the yaw and in-plane directions for maintaining precise slider positioning.

Head 28 preferably comprises a slider 32 supporting at least one magnetoresistive sensor element. Slider 30 can include an air bearing surface. Head 28 retrieves information stored on memory storage disc 12. In addition, if equipped with a write transducer, head 28 also stores information on memory storage disc 12. Head 28 is electrically connected to detection circuitry 16 via electrical conductors 18 which extend between the magnetoresistive element of head 28 as well as any additional reading or writing sensors/transducers and detection circuitry 16.

Detection circuitry 16 preferably comprises a conventional circuit board mounted adjacent to the actuator (not shown). As is conventionally known, detection circuitry 16 typically includes a preamp unit. The preamp unit transmits a sense current through one of the electrical conductors to the magnetoresistive sensor element of head 28. The current is returned from the magnetoresistive sensor element of head 28 to the preamp of detection circuitry 17 via a second one of the electrical conductors electrically interconnecting the magnetoresistive sensor element of head 28 and detection circuitry 16. The preamp unit of detection circuitry 16 senses the change in voltage and the corresponding change in resistance across the magnetoresistive transducer or sensor element of head 28 to recover information from memory storage disc 12.

Figure 2:
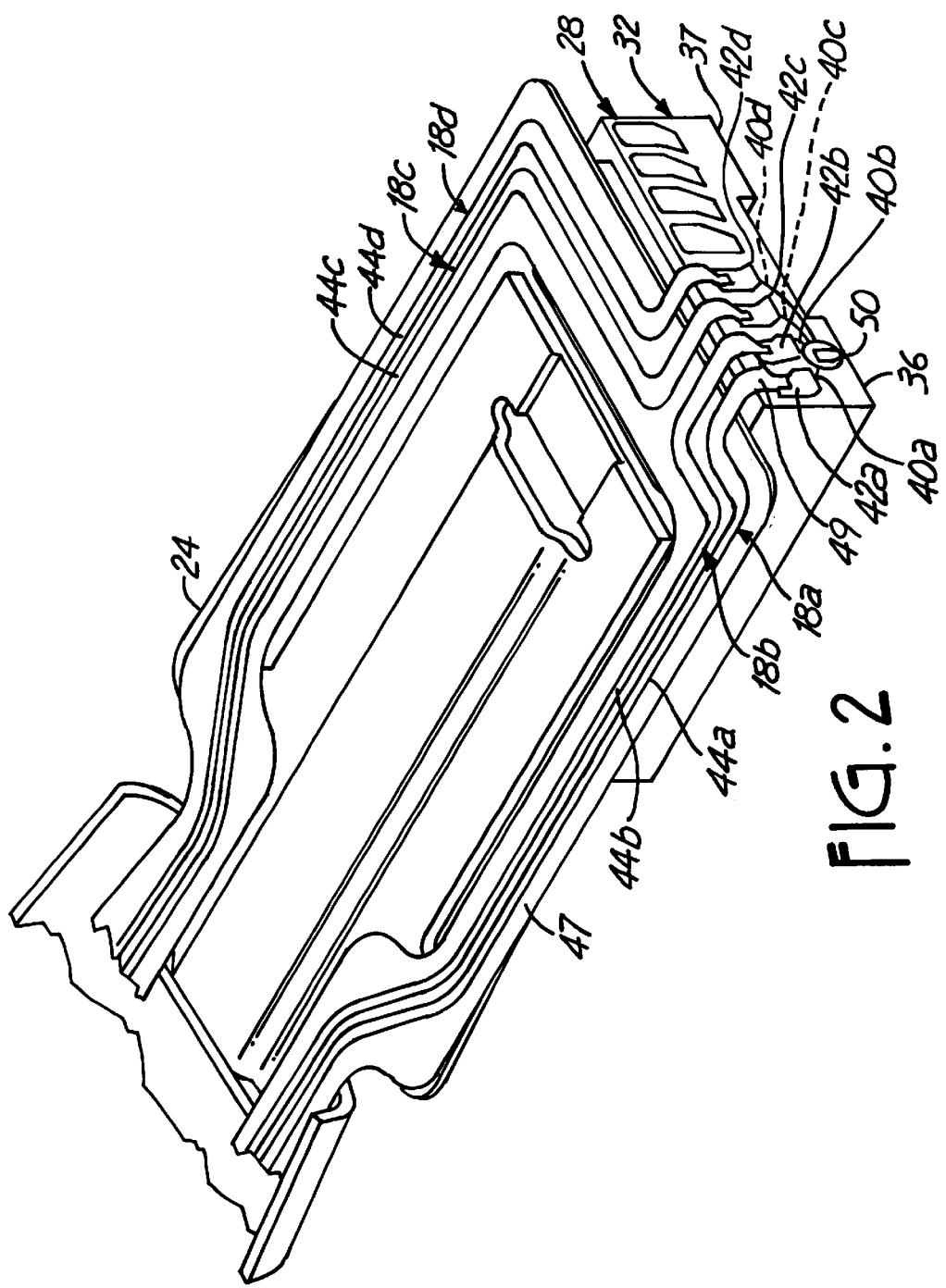
FIG. 2 is an enlarged perspective view near the slider of FIG. 1.

FIG. 2 is an enlarged fragmentary perspective view near head element 28 illustrating one embodiment of suspension 24 and head 28 in greater detail. As best shown by FIG. 2, head 28 is mounted to suspension 24 below suspension 24 and includes slider 30 and a magnetoresistive transducer 50. Slider 34 is conventionally known and preferably includes a pair of self-acting hydrodynamic air bearing rails 36, 37. When disc 12 rotates, disc 12 draws air between air bearing rails 36, 37 and the surface of disc 12 to pressurize air bearing rails 36, 37 and to levitate slider 32. As a result, slider 30 flies above disc 12.

Magnetoresistive sensor transducer 50 is conventionally known. Transducer 50 has a resistance which modulates in response to changing magnetic fields corresponding to magnetically encoded information upon memory storage disc 12.

In the embodiment illustrated, head 28 includes an additional element, preferably an inductive write head, which is stacked between slider 30 and transducer 50. Sensor elements may also be fabricated on or mounted to both rails 36, 37 of slider 30 as well as other portions of slider 30 adjacent memory storage disc 12.

Electrical conductors 18a–18d include conductive traces 40a–40d, contact pads 42a–42d and conductive traces 44a–44d. Conductive traces 40a–40d are made of an electrically conductive material such as copper and are fabricated upon slider 30. Conductive traces 40a–40d are preferably deposited upon a wafer containing a plurality of sliders 30. Conductive traces 40a and 40b electrically connect transducer 50 and contact pads 42a and 42b, respectively. Conductive traces 40c and 40d electrically interconnect contact pads 42c and 42d with an additional sensor element (not shown) which is stacked between transducer 50 and slider 30.

Contact pads 42a–42d are formed from an electrically conductive material, such as copper, and are also fabricated upon a surface of slider 30. Contact pads 42a–42d are electrically connected to conductive traces 40a–40d, respectively, and provide a large surface area to which conductive traces 44a–44d may be electrically connected or bonded, respectively. Contact pads 42a–42d, also known as bond pads, enable conductive traces 44a–44d to be easily electrically connected to magnetoresistive transducer 50.

Conductive traces 44a–44d comprise lines of electrically conductive material, such as copper, which are fabricated or deposited upon a dielectric material such as a polyimide or a polyester such as polyethyleneterephthalate (PET) which is preferably flexible to form a flex circuit 47. Conductive traces 44a–44d preferably extend beyond the dielectric material of flex circuit 47 in the form of flying leads 49 which are bonded to contact pads 42a–42d, respectively, by ultrasonic welding. In one embodiment, a solder ball bonding technique is used and flying lead 49 is not required. Flex circuit 47 is adhesively secured to suspension 24 by an adhesive such as a viscoelastic adhesive or a rigid adhesive such as an epoxy or cyanoacrylate. In the preferred embodiment illustrated, the flex circuit 47 containing conductive traces 44a–44d is adhesively secured above suspension 24 and slider 30. Alternatively, flex circuit 47 may be secured by other methods such as bonding or crimping and may also be below suspension 24. Flex circuit 47 and conductive traces 44a–44d extend along support arm 22 and actuator arm 20 (shown in FIG. 1) to detection circuitry 16. Alternatively, as can be appreciated, individual or bundled wires or other conducting interconnects may be used in lieu of flexible circuit 47 and conductive traces 44 for providing an electrical connection between transducer 50 and detection circuitry 16.

Figure 3:
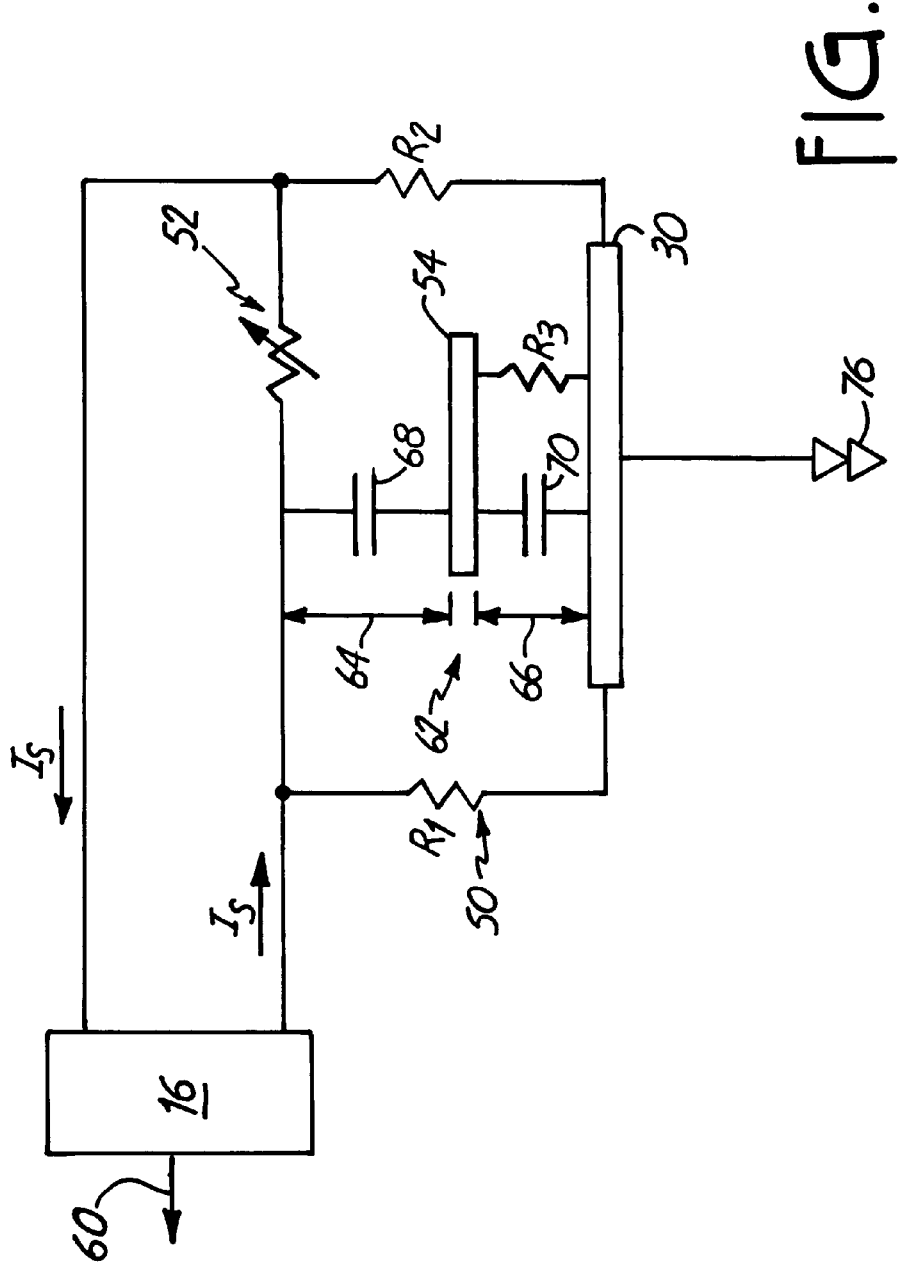
FIG. 3 is a simplified schematic diagram of a magnetoresistive transducer including at least one bleed resistor in accordance with one example embodiment.

FIG. 3 is a simplified electrical schematic diagram illustrating one example embodiment of a magnetoresistive element transducer 50 of the present invention. Transducer 50 includes the slider (or substrate) 30 which provides a substrate for carrying a magnetoresistive element 52. A magnetic shield 54 is carried on the slider 30 and is provided to shield the magnetoresistive element 52 from stray magnetic fields. Additional shields may also be provided. As used herein, the magnetoresistive element 52, alone or in combination with a shield such as shield 54, provides a magnetoresistive assembly 62. In operation, magnetic flux from the disc 12 interacts with magnetoresistive element 52 to cause the resistance of element 52 to change. A sense current, $I_S$ is passed through magnetoresistive element 52 by detection circuitry 16. Circuitry 16 senses the change in voltage across by element 52 and responsively provides an output 60 related to data stored on the magnetic disc 12.

FIG. 3 also illustrates insulation layers 64 and 66 which form capacitors 68 and 70, respectively. Insulation layer 64 is a layer or layers which separates the magnetoresistive element 52 from the magnetic shield 54. Capacitor 68 is the resultant capacitance formed between element 52 and shield 54. Similarly, insulating layer or layers 66 separates shield 54 from the slider 30 which results in a capacitance 70 formed therebetween.

As discussed in the Background section, at various times during the fabrication and life of the magnetoresistive transducer 50, electrostatic charge can build up and its discharge can damage the sensitive components. For example, plasma processes which are used to fabricate the magnetoresistive transducer can cause such a charge build up. Similarly, when individual or groups of transducers are handled during fabrication, such as during machining, assembling the head gimbal assembly (HGA), assembling the head stack assembly (HSA), merging the heads with the disc, etc., charge can accumulate at the electrical terminals that couple to magnetoresistive element 52. Regardless of the mechanism which generates this static charge, the potential differences which result from the charge can easily exceed the discharge threshold levels of the various components which can lead to a latent or catastrophic electrostatic discharge (ESD) damage.

In one aspect, the present invention introduces at least one bleed resistor element in the magnetoresistive transducer 50 which is configured to have a relatively high resistance and provide a discharge path for accumulated charge to an appropriate electrical ground, between the terminals which couple to the magnetoresistive element 52, or other charge receiver. Potential differences across the magnetoresistive element 52 and also the system ground can be reduced such that electrostatic discharge is prevented. In the example embodiment of FIG. 3, resistors $R_1$, $R_2$ and $R_3$ are introduced to provide such discharge paths. $R_1$ and $R_2$ couple either side of the magnetoresistive element 52 to the substrate 30. Typically, substrate 30 is coupled to electrical ground. Note that FIG. 3 is a schematic diagram and resistors $R_1$ and $R_2$ can couple to the same physical location on the substrate 30 such that they are effectively coupled together and provide a discharge path across magnetoresistive element 52 which will balance any charge build-up on element 52. Similarly, a bleed resistor $R_1$ provides a discharge path between shield 54 and substrate 30. Again, in the schematic illustration of FIG. 3, resistor $R_3$ would typically be coupled to the same location on substrate 30 and thereby effectively provide a discharge path between either side of magnetoresistive element 52 and shield 54. The particular configuration, positioning or number of bleed resistors can be modified as desired. Those skilled in the art will recognize that the particular configuration shown in FIG. 3 can be modified and the connections of the lead resistors repositioned and still achieve effective electrostatic discharge. Such embodiments are within the scope of the present invention. In general, the bleed resistors provide a continuous high impedance discharge path between various elements in magnetoresistive transducer 50. In one embodiment, bleed resistors $R_1$, $R_2$ and $R_3$ have a value of more than about 1 MΩ and in a specific example can be about 2 MΩ. In the embodiments shown in FIG. 2, slider 30 is coupled to an electrical system 76. For example, this connection can be to the suspension assembly which provides an electrical ground. If the substrate 30 is of a non-conductive material, an electrical connection can be provided to ground 76 such as through a conductor. In such an embodiment, a via (discussed below) may not be used.

In one preferred embodiment, the bleed resistors of the invention are fabricated directly onto the magnetoresistive transducer. However, they may be placed at other locations such as in the connectors which electrically couple the magnetoresistive transducer to external circuitry, such as circuitry 16. The resistors are preferably mechanically robust and do not have any undesirable magnetic or electrical effects on the transducer 50. When small resistance values for the bleed resistors are selected, increased noise in the readback signal may occur. Such noise can be reduced by increasing the resistance of the bleed resistors. Resistances typically can be selected which provide sufficiently low noise yet are small enough to provide a sufficient discharge path for static charge.

Figure 4:
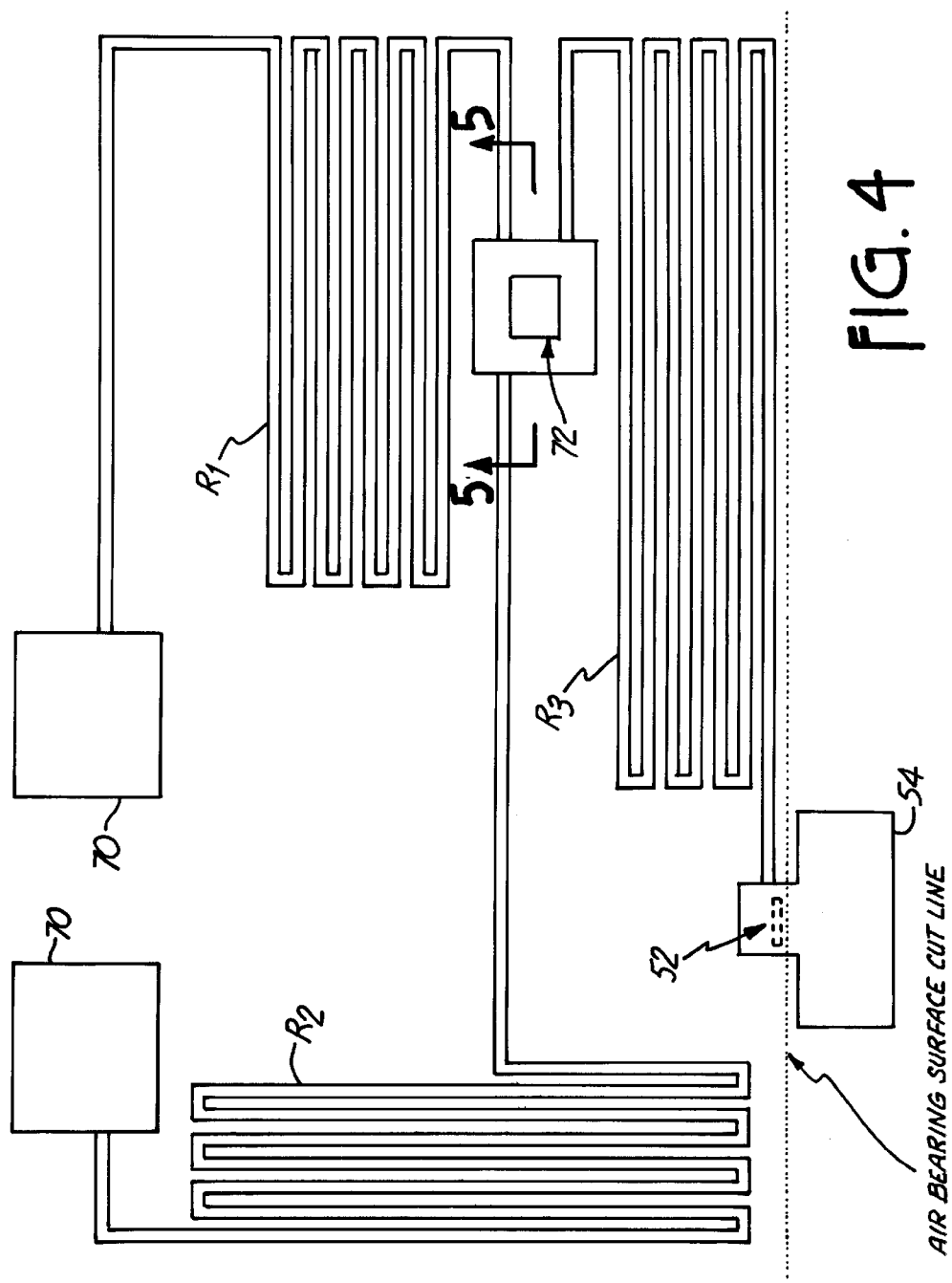
FIG. 4 is a top plan view of the magnetoresistive transducer of FIG. 3 shown during the fabrication process.

FIG. 4 is a top plan view of magnetoresistive transducer 50 which shows connecting straps 70 which provide the electrical connection to the magnetoresistive element 52 shown in FIG. 3. In FIG. 4, the magnetoresistive sensor element 52 has not yet been deposited. The bleed resistor electrical terminals can be fabricated using the seed layer metal. The bleed resistors themselves are buried under an insulting layer such as alumina used for back fill during the fabrication process and prior to chemical-mechanical-planaraization (CMP) of the substrate prior to fabrication of element 52. Note that if a top shield is deposited (not shown), it will typically be electrically connected to shield 54 and therefore charge from the top shield will be bled through resistor $R_3$. Resistors $R_1$, $R_2$ and $R_3$ are shown as wire traces deposited on substrate 30 which provide electrical connections in accordance with the present invention between straps 70 and a via 72 and bottom shield 54 and via 72. Via 72 provides an electrical connection from a top surface of transducer 50 and the slider 30. This is shown in more detail in the cross-sectional view of FIG. 5.

Figure 5:
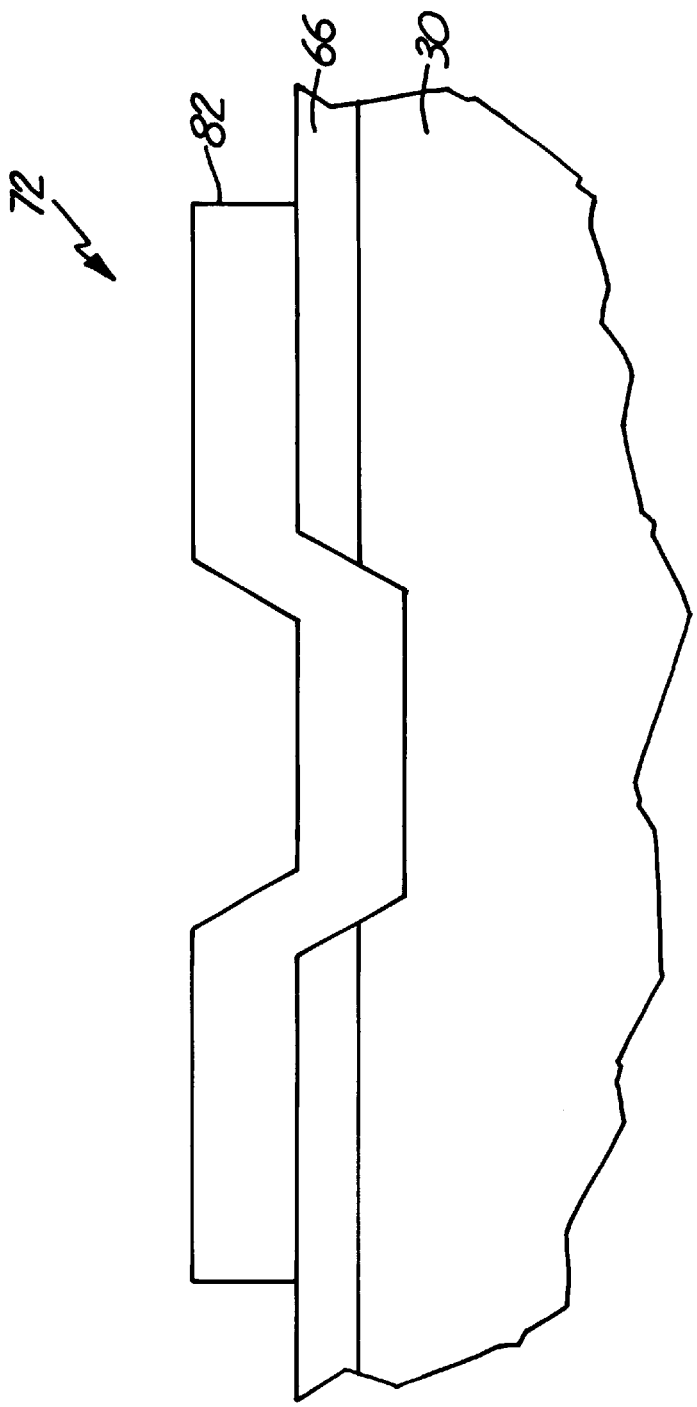
FIG. 5 is a side cross-sectional view showing a via in the magnetoresistive transducer shown in FIG. 4.

As illustrated in FIG. 5, a base coat 62 is deposited on substrate 30. A metallization plug 82 electrically couples to the bleed resistors and provide an electrical connection to substrate 30. Those skilled in the art will recognize that via 72 can be fabricated using any appropriate technique including lithographic processes. Any number of vias or configurations can be used. The invention is not limited to embodiments which use a via for forming an electrical connector.

Preferably, the bleed resistors of the present invention are fabricated early in the wafer a manufacturing process, for example, immediately after deposition of base coat Insulator layer. This provides the greatest protection over the duration of fabrication with the least amount of increase in processing steps. The resistors may be fabricated or provided using any appropriate technique. In the particular embodiment illustrated in FIG. 4, the bleed resistors are fabricated using lithographic processes which define a serpentine pattern which is then ion milled into a thin film of sputtered TaN. In one example, the sheet resistance of the sputtered TaN is on the order of one to ten thousand ohms per square, depending on its thickness and composition. 1:1 stoicheometric composition as well as high nitrogen containing TaN films can be used. High nitrogen containing TaN films provide increased film resistance and may be desirable for future generation heads which require increased bleed resistor values to provide improved noise immunity while also reducing the area required for the resistor and the resultant capacitance. For a given TaN composition and resistivity, the film thickness can be used as an independent parameter for controlling the film resistance. One example thickness range is from 60 Å to 1000 Å.

There are a number of steps during the manufacturing process in which the present invention can be particularly useful. In addition, the present invention is effective in reducing charge which can lead to ESD throughout the entire life of the transducer. For example, during the wafer manufacturing process, the substrate is in electrical contact with an electrical ground of the plasma process tools. Surface charge generated on the wafer conductors during plasma processing is bled through the bleed resistors at each of the numerous transducers deposited across the wafer surface to the substrate and the electrical system ground. The bleed resistors are also effective during the various milling and etching processes used in the manufacturing process.

Following completion of the wafer processing steps, the substrate is cut into bars and mechanically lapped and polished to achieve the appropriate dimension of the transducer relative to the air bearing surface of the slider. The bleed resistors of the present invention also provide a discharge pass path for charge which may accumulate during the various processing steps used to fabricate the air bearing surface. Because sensor element 52 does not need to be electrically shorted during the lapping process to reduce static charge, with the present invention it is possible to use element 52 itself as a lapping sensor by monitoring the resistance of element 52 during the fine lapping and polishing steps. Because the sensor element itself is used as a lapping guide, the variations in the sensor resistances and amplitudes seen during fabrication can be greatly reduced which thereby increases the yield of the slider manufacturing process. Because additional fine lapping guides are not required, the wafer yield loss associated with such guides can also be eliminated thereby further increasing production yield.

The lapped bars are then diced into individual sliders which are mounted into head gimbal assemblies (HGAs). The manufacturing process subsequent to making the HGA is a highly manual process and, therefore, susceptible to tribocharging of the transducer leads and terminals. Electrostatic discharge damage which occurs during fabrication of the head stack assembly (HSA) and during merging the heads with the drive is very costly because the rework procedure which involve damaged HGA replacements are time consuming and cumbersome. A significant amount of capital investment and consumable items are required to maintain a low level of electrostatic voltage present within the assembly areas. Yet, at the current rate of increase in head ESD sensitivity, the environmental controls will soon become ineffective. The bleed resistors of the present invention can reduce the electrostatic discharge throughout these portions of the manufacturing process as well leading to significant yield improvement as well as cost reduction in plant equipment and materials.

The resistance values of the bleed resistors should be chosen so as not to degrade performance of the transducer. Preferably, the resistance value is such that there is no spurious noise which is picked up through the resistive and capacitive loads represented by the bleed resistors at the detection circuitry 16. Using one model, it was observed that if the values of the resistors was greater than about 1 MΩ. The noise pickup was negligibly small for typical present day transducers. However, these values should be adjusted for a particular transducer or a given sensitivity requirement of the system.

In general, the bleed resistors of the present invention should have a relatively large resistance in comparison to the magnetoresistive element in the electrical connections which are used to couple to the magnetoresistive element. This is in contrast to typical prior art electrostatic discharge techniques used in magnetoresistive sensors which focused on low impedance discharge paths or non-linear elements.

In various aspects of the invention, a magnetoresistive transducer 50 is provided. The transducer 50 includes a substrate 30 having at least one insulating layer such as insulating layer 64, 66 carried thereon. A magnetoresistive assembly 52 is coupled to the substrate through at least one bleed resistor such as bleed resistor $R_1$, $R_2$, and/or $R_3$. The magnetoresistive assembly includes a magnetoresistive element 52 and the bleed resistor can connect one end of the element to the substrate. An additional bleed resistor can be provided to connect the other end of the magnetoresistive element to the substrate. In one aspect, a shield 54 is included in the assembly 52 and is coupled to the substrate by the bleed resistor. The bleed resistor can be coupled to the substrate through a via in the insulating layer. The substrate 30 can form a slider of the type used in a magnetic storage system such as a tape storage system or a disc storage system. The invention also includes a method of fabricating a magnetoresistive transducer which includes providing an electrical path between a magnetoresistive assembly and a substrate.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetoresistive transducer while maintaining substantially the same functionality without departing from the scope and spirit of the present invention. In addition, although the preferred embodiment described herein is directed to a transducer for a disc storage system, it will be appreciated by those skilled in the art that the teachings of the present invention can be applied to other systems, like tape storage system or any other systems in which magnetic flux is measured, without departing from the scope and spirit of the present invention. The bleed resistors of the present invention can be connected in parallel, series, or seriesparallel with other electrical elements and aspects of the invention are intended to cover such configurations.

What is claimed is:

1. A magnetoresistive transducer, comprising:
   a substrate;
   an insulating layer on the substrate;
   a magnetoresistive assembly including a magnetoresistive element on the insulating layer and a shield; and
   first resistor electrically coupled between first end of magnetoresistive element and the substrate;
   a second bleed resistor electrically coupled between a second end of magnetoresistive element and the substrate; and
   a third bleed resistor electrically coupled between the shield and the substrate;
   wherein the bleed resistors have relatively large electrical resistances.

2. The magnetoresistive transducer of claim 1 including a via through the insulating layer which electrically couples bleed resistors to the substrate.

3. The magnetoresistive transducer of claim 1 wherein the bleed resistors have a resistance of more than about 1 MΩ.

4. The magnetoresistive transducer of claim 1 wherein the magnetoresistive element has first and second differential output terminals and the first and second bleed resistors are connected in series with the respective first and second differential outputs.

5. The magnetoresistive transducer of claim 1 wherein the first and second bleed resistors have resistance values which are substantially the same.

6. The magnetoresistive transducer of claim 1 wherein the substrate comprises a slider.

7. A magnetic storage system including magnetic disc and a slider having a magnetoresistive transducer in accordance with claim 6, wherein the slider is positioned proximate the magnetic disc.

8. A method of manufacturing a magnetoresistive transducer, comprising:

forming a magnetoresistive assembly including a magnetoresistive element and a shield on a substrate, the magnetoresistive assembly separated from the substrate by an insulating layer; and electrically connecting a first end of the magnetoresistive element to the substrate through a first bleed resistor;

electrically connecting a second end of the magnetoresistive element to the substrate through a second bleed resistor;

electrically connecting the shield to the substrate through a third bleed resistor.

9. The method of claim 8 wherein electrically connecting the bleed resistors comprises coupling the resistors to the substrate through vias in the insulating layer.

10. The method of claim 8 wherein the resistors have an of the of more than about 1 M$\Omega$.

11. The method of claim 8 wherein electrically connecting comprises performing lithographic steps.

12. The method of claim 8 including lapping the substrate and measuring resistance of the magnetoresistive sensor during lapping.

13. A magnetoresistive transducer in accordance with claim 8.

14. A magnetic storage system including a magnetoresistive transducer of claim 13.

15. A magnetoresistive transducer comprising:

a magnetoresistive assembly including a magnetoresistive element and shield;

first and second bleed resistor means for discharging electrostatic charge from first and second ends of the element, respectively; and third bleed resistor means for discharging electrostatic charge from the shield.

* * * * *

UNITED STATES PATENT AND TRADEMARK OFFICE
CERTIFICATE OF CORRECTION

PATENT NO. : 6,728,082 B2  Page 1 of 1
DATED : April 27, 2004
INVENTOR(S) : Tabat et al.

It is certified that error appears in the above-identified patent and that said Letters Patent is hereby corrected as shown below:

Column 8,
Line 54, before "first resistor" insert -- a --.

Column 10,
Line 6, after "an" insert -- impedance --.

Signed and Sealed this

Fourteenth Day of September, 2004

JON W. DUDAS
*Director of the United States Patent and Trademark Office*